(12) United States Patent
Li et al.

(10) Patent No.: US 7,701,734 B2
(45) Date of Patent: Apr. 20, 2010

(54) DETECTION CIRCUIT TO DETECT INPUT VOLTAGE OF TRANSFORMER AND DETECTING METHOD FOR THE SAME

(75) Inventors: Chuh-Ching Li, Taoyuan County (TW); Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/465,364

(22) Filed: Aug. 17, 2006

(65) Prior Publication Data

US 2008/0048633 A1    Feb. 28, 2008

(51) Int. Cl.
*H02M 3/335* (2006.01)
(52) U.S. Cl. .................. 363/21.16; 363/21.08
(58) Field of Classification Search .......... 363/21.01, 363/21.04, 21.07, 21.08, 21.09, 21.12, 21.15, 363/21.16, 21.17, 97, 131; 323/224, 265, 323/282, 284, 285, 299, 351
See application file for complete search history.

(56) References Cited

U.S. PATENT DOCUMENTS

| 5,841,641 | A  | * | 11/1998 | Faulk ...................... 363/21.14 |
| 5,874,841 | A  | * | 2/1999  | Majid et al. .................... 327/94 |
| 6,661,679 | B1 | * | 12/2003 | Yang et al. ..................... 363/41 |
| 6,836,415 | B1 | * | 12/2004 | Yang et al. ................ 363/21.01 |
| 6,853,563 | B1 |   | 2/2005  | Yang et al. |
| 7,016,204 | B2 |   | 3/2006  | Yang et al. |
| 7,102,899 | B2 | * | 9/2006  | Reinhard et al. ......... 363/21.01 |
| 7,257,008 | B2 | * | 8/2007  | Yang et al. ............... 363/21.12 |
| 7,259,692 | B1 | * | 8/2007  | Eichenberg ................ 340/908 |
| 7,486,529 | B2 | * | 2/2009  | Sukup ......................... 363/49 |

\* cited by examiner

*Primary Examiner*—Gary L Laxton
(74) *Attorney, Agent, or Firm*—J.C. Patents

(57) ABSTRACT

A circuit and a method for detecting a voltage of a transformer are provided. The circuit includes a current output circuit coupled to a winding of a transformer to generate a current signal. A current-to-voltage circuit is coupled to the current output circuit to generate a voltage signal in response to the current signal. A sample-and-hold circuit generates an output signal by sampling the voltage signal. An input voltage is applied to the transformer. The output signal is correlated to the input voltage of the transformer.

10 Claims, 2 Drawing Sheets

DETECTION CIRCUIT TO DETECT INPUT VOLTAGE OF TRANSFORMER AND DETECTING METHOD FOR THE SAME

BACKGROUND OF THE INVENTION

1. Field of the Invention

The present invention generally relates to a power converter, and more particularly to a control circuit and detecting method of a switching power converter.

2. Description of Related Art

Various power converters have been widely used to provide regulated voltage and current. For the sake of safety reasons, an off-line power converter uses a transformer to provide isolation between its primary side and secondary side. Because a reflected voltage of the transformer can be used for regulations, the control circuit of the power converter normally includes a voltage-detection terminal for detecting the reflected voltage. In recent development, many control schemes have been disclosed in U.S. Pat. No. 6,853,563 issued to Yang, et al., entitled "Primary-side controlled flyback power converter", and U.S. Pat. No. 7,016,204 issued to Yang et al., entitled "Close-loop PWM controller for primary-side controlled power converters", in which a voltage-detection terminal is used as a feedback input terminal. An object of the present invention is to develop a detection circuit using the voltage-detection terminal to detect the input voltage of transformer. Therefore, no further feedback input terminal is needed.

SUMMARY OF THE INVENTION

The present invention provides a detection circuit and detecting method to detect a voltage of a transformer. The detection circuit comprises a current output circuit coupled to a winding of a transformer to generate a current signal. A current-to-voltage circuit is coupled to the current output circuit to generate a voltage signal in response to the current signal. A sample-and-hold circuit generates an output signal by sampling the voltage signal. A pulse generator is coupled to the sample-and-hold circuit to provide a pulse signal in response to the switching of the transformer. The operation of the sample-and-hold circuit provides low pass filtering to the output signal. An input voltage is applied to the transformer. The input output signal is correlated to the voltage applied to the transformer.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
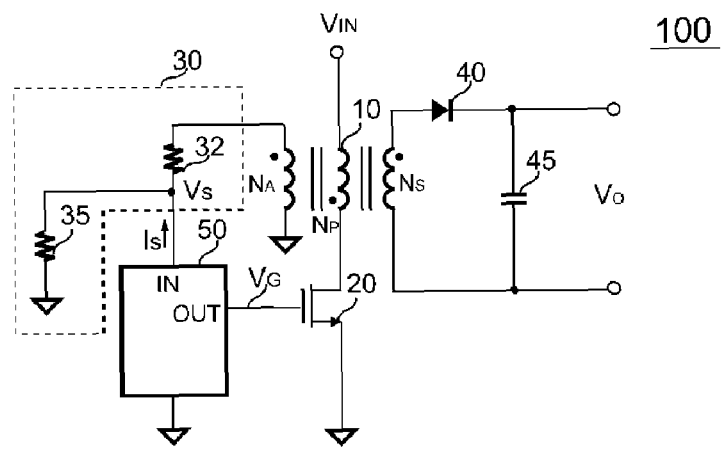
FIG. 1 shows a schematic diagram of a power converter having a voltage detection terminal coupled to a transformer.

FIG. 1 shows a power converter 100 of a preferred embodiment of the present invention. The power converter 100 at least includes a transformer 10 and a control circuit 50. The transformer 10 includes a primary winding $N_P$, a secondary winding $N_S$ and an auxiliary winding $N_A$. The secondary winding $N_S$ produces an output voltage $V_O$ of the power converter 100 through a rectifier 40 and a capacitor 45. The primary winding $N_P$ of the transformer 10 is connected to an input voltage $V_{IN}$ to a transistor 20. The transistor 20 is used for switching the transformer 10 and regulating the output voltage $V_O$ of the power converter 100. A control circuit 50 includes a voltage-detection terminal IN coupled to the auxiliary winding $N_A$ of the transformer 10 through a voltage divider 30. In an embodiment, resistors 32 and 35 form the voltage divider 30.

Figure 2:
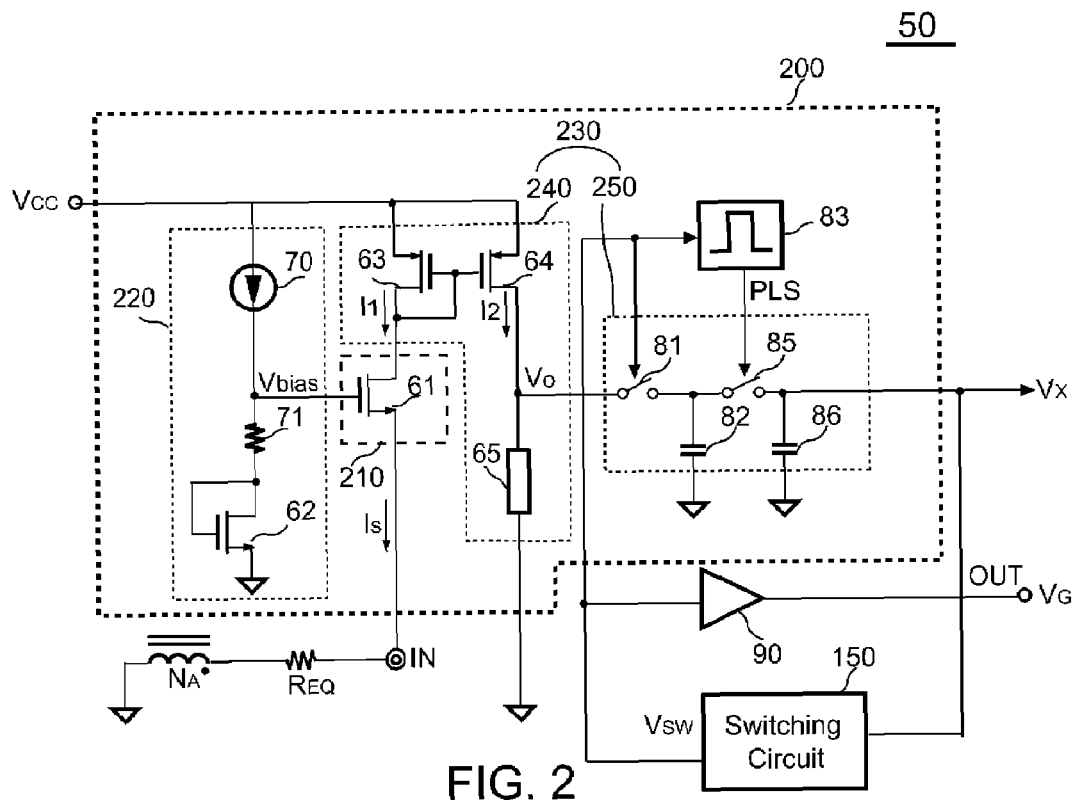
FIG. 2 shows a schematic diagram of a preferred embodiment of a detection circuit according to the present invention.

FIG. 2 shows a circuit diagram of a preferred embodiment of a detection circuit 200 of the control circuit 50 according to the present invention. The detection circuit 200 comprises a first circuit 210 coupled to the voltage-detection terminal IN to generate a current signal $I_S$. The first circuit 210 is a current output circuit developed by a transistor 61, for example. A bias circuit 220 is coupled to the first circuit 210 to provide a bias voltage $V_{bias}$ to the gate of the transistor 61. In an embodiment, a constant current source 70, a resistor 71 and a transistor 62 form the bias circuit 220 to generate the bias voltage $V_{bias}$. The voltage of the voltage-detection terminal IN is clamped to a voltage $V_S$, as shown in FIG. 1, if a negative current is applied to the voltage-detection terminal IN. The voltage $V_S$ is determined by the current of the constant current source 70 and the resistance of the resistor 71. The current signal $I_S$ can be expressed as, $$I_S = \frac{V_S - \left(-\frac{T_{NA}}{T_{NP}} \times V_{IN} \times K\right)}{R_{EQ}} \quad (1)$$

where the $T_{NA}$ and $T_{NP}$ are winding turns of the auxiliary winding $N_A$ and the primary winding $N_P$ respectively; K is the ratio of the divider 30 of FIG. 1 (resistors 32 and 35); $R_{EQ}$ is an equivalent resistance of resistors 32 and 35; $V_{IN}$ is the input voltage of the transformer 10.

A second circuit 230 is coupled to the first circuit 210 to generate an output signal $V_X$ in response to the current signal $I_S$. The output signal $V_X$ is transmitted to a switching circuit 150. The second circuit 230 includes a current-to-voltage circuit 240 and a sample-and-hold circuit 250. The current-to-voltage circuit 240 is connected to the first circuit 210 to generate a voltage signal $V_O$ in accordance with the current signal $I_S$ generated by the first circuit 210. The sample-and-hold circuit 250 further generates the output signal $V_X$ by sampling the voltage signal $V_O$. Transistors 63, 64 and a resistive device 65 develop the current-to-voltage circuit 240, for example. The transistor 63 is coupled to receive the current $I_1$ of the transistor 61. The transistor 64 mirrors the current $I_1$ from the transistor 63 to a current $I_2$ applied to the resistive device 65. The voltage signal $V_O$ is generated at the resistive device 65. The sample-and-hold circuit 250 includes switches 81, 85 and capacitors 82, 86. The switch 81 is connected to the resistive device 65 to sample the voltage signal $V_O$ to the capacitor 82. The switch 85 is connected to the capacitor 82 to sample the signal from the capacitor 82 to the capacitor 86. The capacitance of the capacitor 86 is larger than the capacitance of the capacitor 82. Therefore, the switching of switch 85 and 86 develops a low pass filter. An output signal $V_X$ is generated at the capacitor 86. Because the input voltage $V_{IN}$ is applied to the transformer 10, the output signal $V_X$ is correlated to the input voltage $V_{IN}$ of the transformer 10. The output voltage $V_X$ can be expressed by the following equations (2) and (3):

$$V_X = I_S \times G \times R_{65} \times \frac{1}{1 + \frac{j\omega}{j\omega_0}} \quad (2)$$

$$V_X = \frac{V_S + \left(\frac{T_{NA}}{T_{NP}} \times V_{IN} \times K\right)}{R_{EQ}} \times G \times R_{65} \times \frac{1}{1 + \frac{j\omega}{j\omega_0}} \quad (3)$$

where G is a gain determined by the geometrical ratio of transistors 63 and 64; $R_{65}$ is the resistance of the resistive device 65; $\omega_0$ is a dominant pole of the low pass filter.

The switching circuit 150 generates a switching signal $V_{SW}$ to regulate the power converter 100 in response to the output signal $V_X$. A switching signal $V_{SW}$ of the power converter 100 is used to generate a drive signal $V_G$ through an output buffer 90 to control the transistor 20 as shown in FIG. 1. The switching signal $V_{SW}$ is further coupled to control the on/off of the switch 81. Therefore, the sampling of the voltage signal $V_O$ is performed when the transistor 20 is turned on.

Figure 3:
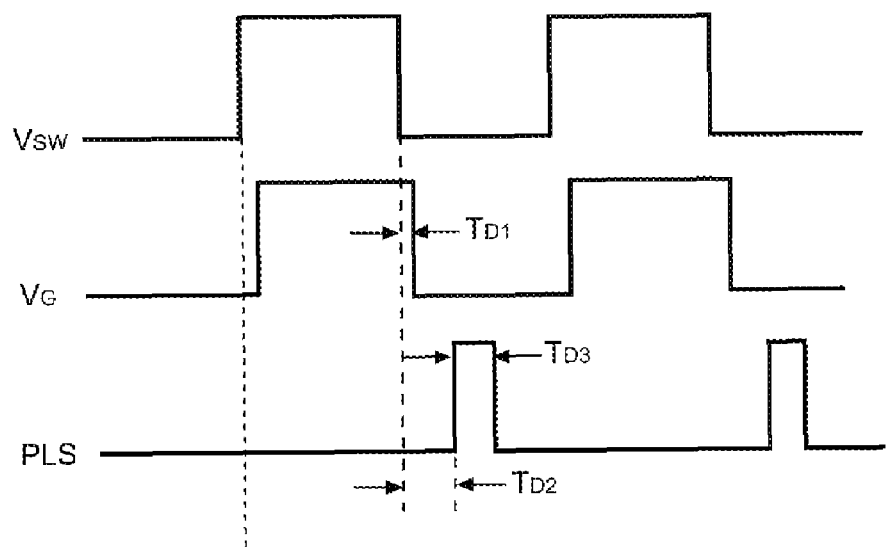
FIG. 3 shows signal-waveforms of the detection circuit according to an embodiment of the present invention.

A pulse generator 83 is utilized to generate a pulse signal PLS in accordance with the falling edge of the switching signal $V_{SW}$. The pulse signal PLS is connected to control the sampling of the switch 85. Then the sampling of the switch 85 is performed after the sampling of the switch 81. FIG. 3 shows signal-waveforms of the switching signal $V_{SW}$, the drive signal $V_G$ and the pulse signal PLS. The output buffer 90 causes a propagation delay $T_{D1}$. The pulse generator 83 generates a delay time $T_{D2}$ and a pulse width $T_{D3}$ of the pulse signal PLS.

Figure 4:
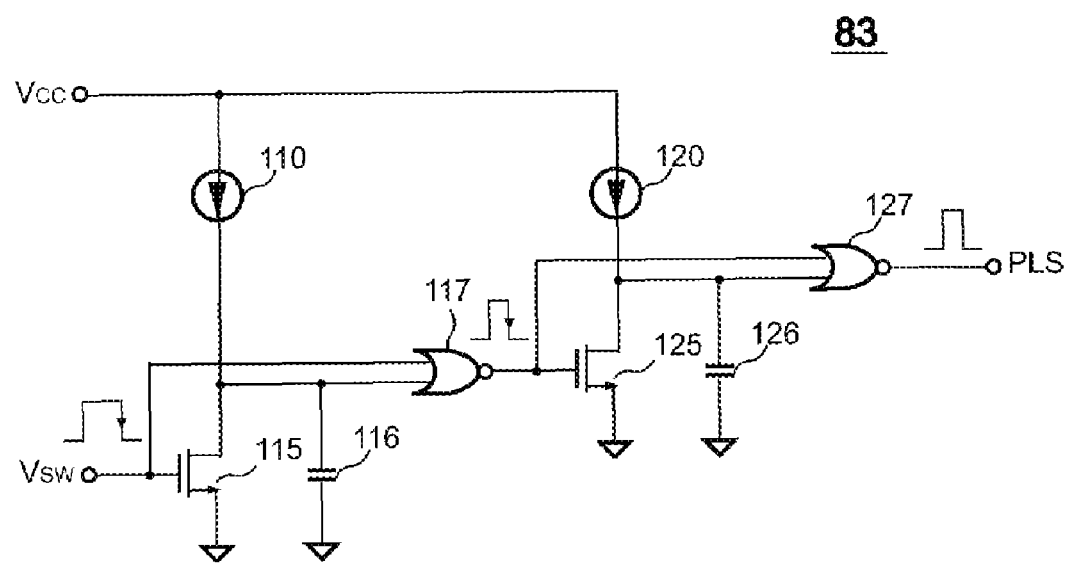
FIG. 4 shows a schematic diagram of a preferred embodiment of a pulse generator according to the present invention.

FIG. 4 shows the schematic diagram of the pulse generator 83. A constant current-source 110, a transistor 115, a capacitor 116 and an NOR gate 117 develop a first pulse generator produces a first pulse signal in response to a falling edge of the switching signal $V_{SW}$. A constant current-source 120, a transistor 125, a capacitor 126 and an NOR gate 127 develop a second pulse generator produces the pulse signal PLS in response to a falling edge of the first pulse signal. The current of the constant current-source 110 and the capacitance of the capacitor 116 determine the pulse width of the first pulse signal. The pulse width of the first pulse signal produces the delay time $T_{D2}$. The current of the constant current-source 120 and the capacitance of the capacitor 126 determine the pulse width $T_{D3}$ of the pulse signal PLS.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A voltage detection circuit, adaptive to detecting an input voltage being applied to a transformer, the voltage detection circuit comprising:
   a current output circuit, coupled to an auxiliary winding of the transformer, to generate a current signal;
   a current-to-voltage circuit, coupled to the current output circuit, to generate a voltage signal in response to the current signal; and
   a sample-and-hold circuit, coupled to the current-to-voltage circuit, to generate an output signal in response to the voltage signal,
   wherein when the input voltage is applied to the transformer, the output signal is correlated to the input voltage applied to the transformer, wherein the current output circuit is coupled to the auxiliary winding of the transformer through a resistor.

2. The voltage detection circuit as claimed in claim 1, further comprising a pulse generator coupled to the sample-and-hold circuit to provide a pulse signal for the sample-and-hold circuit in response to the switching of the transformer.

3. The voltage detection circuit as claimed in claim 1, further comprising a bias circuit coupled to the current output circuit to provide a bias voltage to the current output circuit.

4. A method for detecting an input voltage being applied to a transformer, the method comprising:
   generating a bias voltage in response to a constant current source to generate a current signal;
   generating the current signal in response to the input voltage being applied to the transformer by coupling a current output circuit to an auxiliary winding of the transformer;
   generating a voltage signal in response to the current signal; and
   generating an output signal in response to the voltage signal and a switching signal, wherein the output signal is used to indicate the switching of the transformer and is correlated to the input voltage applied to the transformer.

5. The method as claimed in claim 4, further comprising generating a pulse signal to start to sampling and holding the voltage signal in order to generating the output signal in response to the switching signal.

6. The method as claimed in claim 4, further comprising generating a drive signal in response to the switching signal to switch the transformer.

7. A power converter, comprising a transformer and a control circuit, wherein the control circuit comprises a voltage detection circuit, adaptive to detecting an input voltage being applied to the transformer, wherein the voltage detection circuit comprising:
   a current output circuit, coupled to an auxiliary winding of the transformer, to generate a current signal;
   a current-to-voltage circuit, coupled to the current output circuit, to generate a voltage signal in response to the current signal; and
   a sample-and-hold circuit, coupled to the current-to-voltage circuit, to generate an output signal in response to the voltage signal,
   wherein when the input voltage is applied to the transformer, the output signal is correlated to the input voltage applied to the transformer, wherein the current output circuit is coupled to the auxiliary winding of the transformer through a resistor.

8. A method for detecting an input voltage being applied to a transformer, the method comprising:
   generating a bias voltage in response to a constant current source to generate a current signal;
   generating the current signal in response to the input voltage being applied to the transformer by coupling a current output circuit to an auxiliary winding of the transformer;
   generating an output signal in response to the current signal and a switching signal, wherein the output signal is used to indicate the switching of the transformer and is correlated to the input voltage applied to the transformer.

9. The method as claimed in claim 8, further comprising generating a pulse signal to generate the output signal in response to the switching signal.

10. The method as claimed in claim 8, further comprising generating a drive signal in response to the switching signal to switch the transformer.

* * * * *